United States Patent [19]

Inman et al.

[11] Patent Number: 5,860,271
[45] Date of Patent: Jan. 19, 1999

[54] DEVICE AND METHOD FOR COMPACTING AGRICULTURAL MATERIAL IN A STORAGE BAG

[75] Inventors: Larry Inman; Mike Koskela, both of Astoria; Richard G. Lovell, Warrenton, all of Oreg.

[73] Assignee: Ag-Bag International, Ltd., Warrenton, Oreg.

[21] Appl. No.: 972,230

[22] Filed: Nov. 18, 1997

[51] Int. Cl.[6] ................................................. B65B 01/24
[52] U.S. Cl. ............................... 53/527; 53/529; 53/567; 53/576; 100/100
[58] Field of Search ............................. 53/255, 257, 260, 53/527, 529, 530, 567, 576; 100/65, 66, 100, 144, 145, 148; 141/71, 73, 74, 114, 231, 313, 314, 317

[56] References Cited

U.S. PATENT DOCUMENTS

| | | |
|---|---|---|
| 3,580,166 | 5/1971 | Longo . |
| 4,046,068 | 9/1977 | Eggenmuller et al. ............. 100/100 X |
| 4,256,031 | 3/1981 | Ryan . |
| 4,308,901 | 1/1982 | Lee . |
| 4,310,036 | 1/1982 | Rasmussen et al. ................ 100/189 X |
| 4,337,805 | 7/1982 | Johnson . |
| 4,621,666 | 11/1986 | Ryan . |
| 4,688,480 | 8/1987 | Ryan . |
| 4,724,876 | 2/1988 | Ryan . |
| 4,949,633 | 8/1990 | Johnson et al. ..................... 100/145 X |
| 5,297,377 | 3/1994 | Cullen .................................. 53/567 X |
| 5,345,744 | 9/1994 | Cullen .................................. 53/128.1 |
| 5,377,481 | 1/1995 | Sibley et al. ........................ 100/145 X |
| 5,425,220 | 6/1995 | Cullen .................................. 53/567 X |
| 5,456,075 | 10/1995 | Meijer ................................ 100/189 X |
| 5,459,982 | 10/1995 | Long . |
| 5,463,849 | 11/1995 | Cullen .................................. 53/567 X |
| 5,566,532 | 10/1996 | Inman et al. ......................... 53/576 X |
| 5,671,594 | 9/1997 | Cullen ...................................... 53/567 |

*Primary Examiner*—Daniel B. Moon
*Attorney, Agent, or Firm*—Robert L. Harrington

[57] ABSTRACT

A machine for compacting organic material such as silage and inserting the compacted material into an elongate elastic bag. A rotor positioned at an inlet of a tunnel propels and compacts the material. A barrier positioned in the tunnel strategic to the rotor restricts the flow of material directly into the bag. The barrier forces the material to flow through the barrier and upwardly over the barrier to insure complete filling of the bag. The barrier may be immovable or may be arranged to be pivoted to alter the resistance to the material flow.

6 Claims, 5 Drawing Sheets

DEVICE AND METHOD FOR COMPACTING AGRICULTURAL MATERIAL IN A STORAGE BAG

FIELD OF THE INVENTION

This invention relates to processes and machines used to fill and store materials, e.g., agricultural materials such as silage, in large plastic bags, and more particularly, it relates to the manner of filling the bags to obtain complete filling of the bags.

BACKGROUND OF THE INVENTION

For the purpose of describing the invention, the material to be bagged and stored is assumed to be silage although other materials may benefit from the invention. Silage is a clingy type of material and does not readily flow. The conventional process of bagging silage involves placing of the silage material into a hopper of the bag filling machine where it is fed into a rotor at the inlet to a chamber referred to as a tunnel. The back of the tunnel is open and a bag secured to the tunnel receives material directed from the hopper and through the rotor into the tunnel.

Simply inserting the material into the bag is not satisfactory as the material will simply fill a bottom portion of the bag. Not only is such filling an inefficient use of the bag volume, but the loose-fitting bag is subject to easier tearing and the silage itself does not cure properly.

Previously, packing or compacting of the silage in the bag was accomplished by providing an adjustable backstop for the bag which releasably closes the end of the tunnel. The tunnel is designed to direct the flow of the material from the rotor to shove up against the closed end of the tunnel and then back fill the tunnel until it is completely filled. Further filling creates sufficient pressure to cause the backstop to release incrementally whereby the material compacted inside the tunnel is incrementally released into the bag.

The provision of the adjustable backstop involves considerable mechanism including cables that hold the backstop against the bag end, the cables being wound around drums mounted to the bag filling machine. The drums have brakes that resist unwinding of the cable but which release the cable when subjected to a predetermined pressure. An alternative to the use of a backstop as described above is disclosed in U.S. Pat. No. 5,297,377. In this patent, cables are positioned in the path of the material inside the bag and tunnel. The cables are anchored to each side of the tunnel and the material is simply pushed up against the cables. The cables interfere with free flow of the material but resistively allow the material to flow between the cables and within the bags.

Whereas the cables provide increased packing of the material as compared with a free flow condition, the arrangement has many defects. There is minimal control of how or when the materials flow through the cables. The cables being flexible will open up (become further spaced apart) in response to different flow forces which is but one of the disadvantages encountered.

BRIEF DESCRIPTION OF THE INVENTION

The present invention provides for tunnel packing (as when using a backstop) but without the use of the backstop. This is accomplished by altering or controlling the flow of the material from the rotor into the tunnel. The normal flow of the material was first considered. It was determined that the flow from the rotor and along the bottom of the tunnel needed to be resisted but not prevented, and further that the resistance to flow of material needed to be such as to cause the material to flow upwardly into the top half of the tunnel. Thus, spaced apart barriers are rigidly positioned across the tunnel interior (vertically or horizontally) in the lower half of the tunnel. The barriers (hereafter referred to as barrier fingers or fingers) are spaced to resist free flow of the material, e.g., at about 15 inches apart. As the material engages the fingers and because of the clingy composition of the materials, the space between the fingers rapidly plugs and the material compacts against the fingers. Such compaction continues as the material is forced to crowd against and upwardly on the fingers. Further compaction causes the material to squeeze through the fingers to provide a compacted bottom half of the tunnel with the material forced also to flow upwardly and over the fingers to fill the top half of the tunnel.

Proper arrangement of the fingers in the tunnel results in the pre-compacting of the material in the tunnel which then flows into the bag in the compacted state. Preferably the fingers are mounted vertically and about 15 inches apart, extending to about the middle of the tunnel. Also, it is preferable to make the fingers pivotal whereby should excessive plugging occur, the fingers can be pivoted rearwardly to induce unplugging.

The invention will be more clearly understood and appreciated upon reference to the following detailed description and accompanying drawings.

DESCRIPTION OF THE PREFERRED EMBODIMENT

Figure 1:
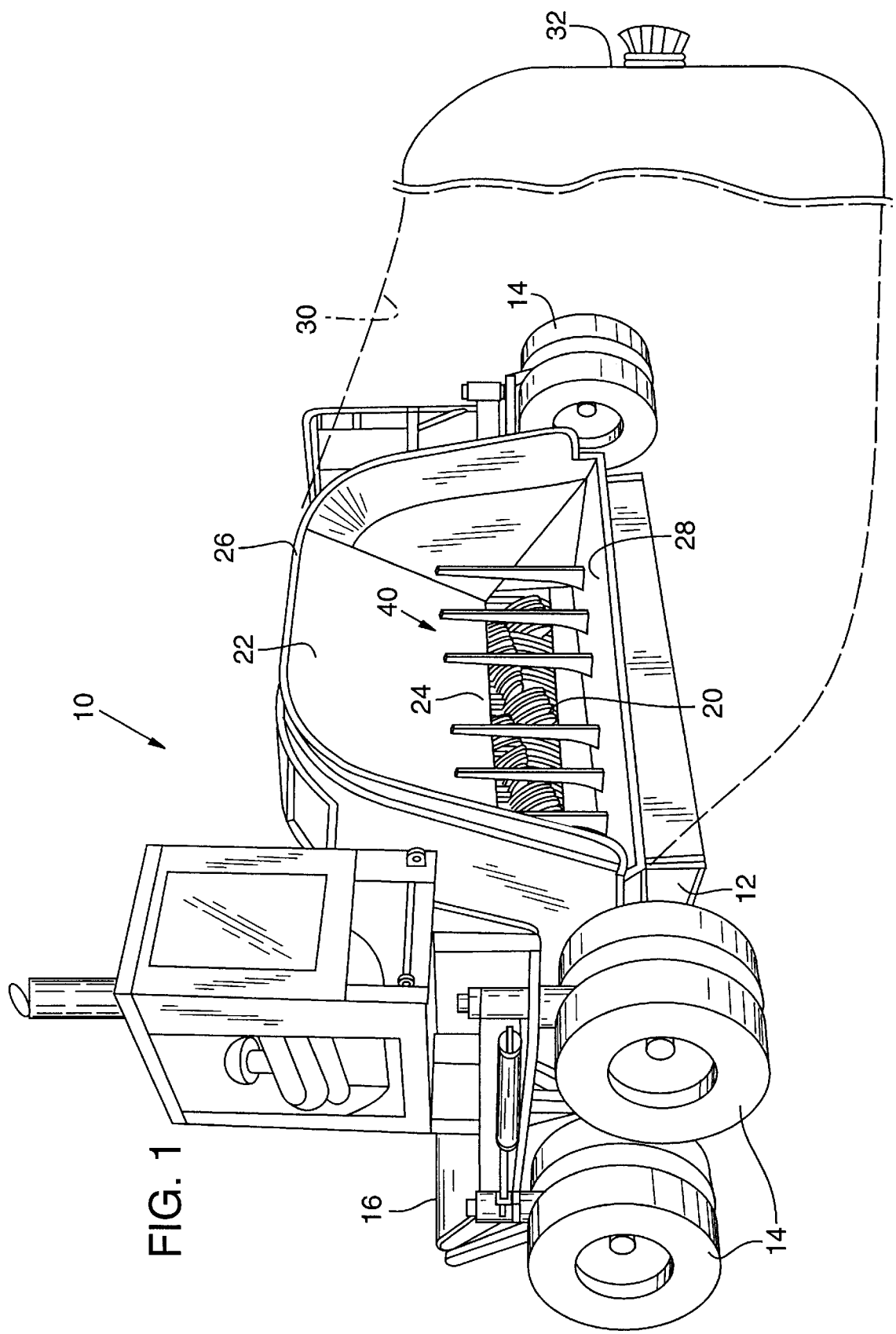
FIG. 1 is a perspective view of the rearward side of a bagging machine of the present invention.

FIG. 1 illustrates a machine 10 arranged to insert organic material such as silage into an elongate elastic bag 30. The machine 10 has a chassis 12 supported on wheels 14. Preferably the wheels 14 have independent braking systems and are further steerable. The machine 10 includes a hopper 16 for receiving the organic material that is to be inserted into the bag 30. A conveyor 18 (FIG. 2) in the hopper 16 delivers the organic material to a rotor 20. The rotor 20 is rotatably mounted strategic to an inlet end 24 of a tunnel 22. The tunnel 22 has an outlet or rearward opening 26 on which the bag 30 is mounted in a folded or gathered condition.

The rotating rotor 20 is arranged to propel the material through the tunnel 22 to fill the bag 30 with the material in a compacted state. Simply forcing the material into the bag 30 by the rotor 20 does not adequately fill the bag 30 nor provide the desired compaction. Further, the unrestrained filling of the bag by the rotor alone requires an auxiliary backstop or restraining device to retard movement of the machine away from the bag. The present invention has apparatus to control the complete filling of the bag 30 and to control the compaction of the material as it is inserted into the bag. The apparatus of the present invention eliminates the need of an auxiliary backstop to retard movement of the machine.

Figure 3:
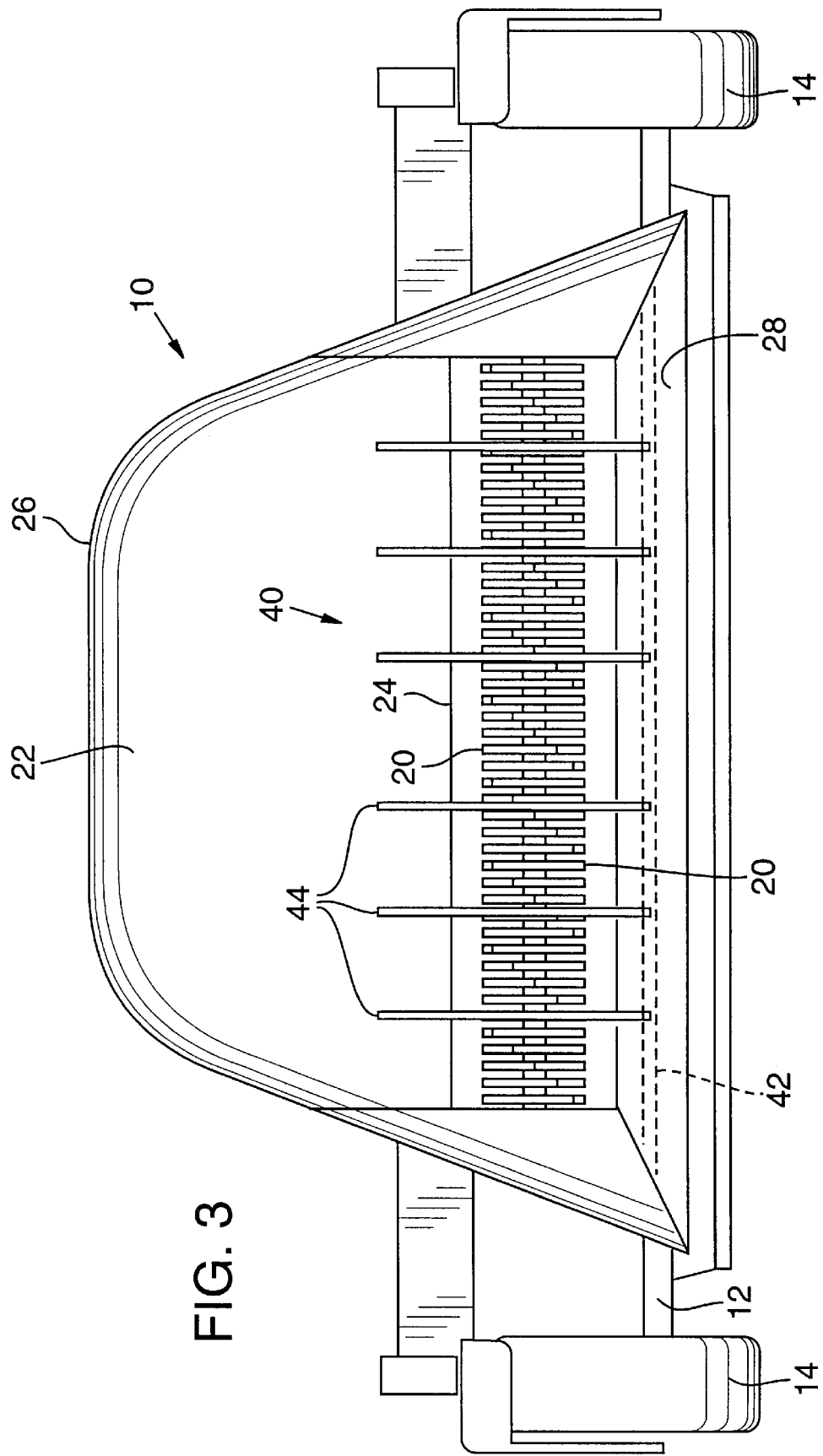
FIG. 3 is a rear view of a barrier of the machine of FIG. 1.

A barrier 40 extends upwardly from the floor 28 of the tunnel 22 and is provided to control the flow of the material into the bag 30. The barrier 40 may be provided in varied configurations and one embodiment is illustrated in FIG. 3. A beam 42 mounted to the chassis 12 is extended across the tunnel 22 as part of the floor 28. The beam 42 supports multiple upstanding fingers 44. The fingers 44 extend upwardly to about the midpoint of the height of the tunnel 22. However, the height of the fingers 44 may be varied to suit the material that is to be bagged. The fingers 44 are preferably removably mounted to the beam 42 in a conventional manner. In this embodiment, the fingers 44 are of the same height thus providing a barrier 40 that extends across the tunnel 22. The number of fingers 44 may be varied as well as the spacing between adjacent fingers 44.

Figure 4:
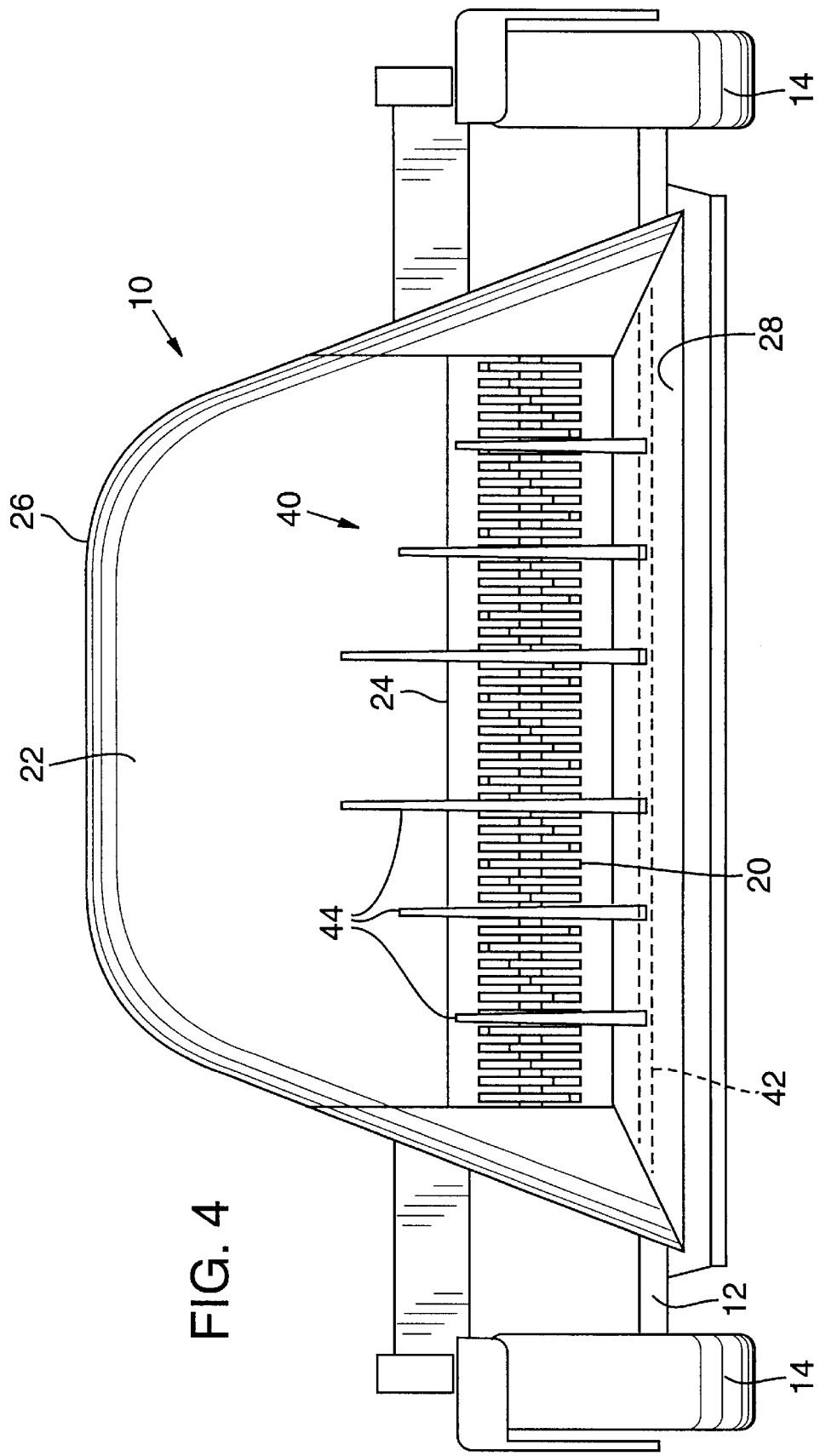
FIG. 4 is an illustration of a second embodiment of the invention.

FIG. 4 illustrates another embodiment of the barrier 40. In FIG. 4 the fingers 44 mounted on the beam 42 are of varying heights, the tallest of the fingers 44 being near the center of the tunnel 22 and decreasing in height toward the sides of the tunnel 22.

The barrier 40 (as illustrated in FIGS. 3 & 4) is provided not only to control the flow of the material into the bag 30 but also to provide a flow restriction to compact the material prior to the material being inserted into the bag 30.

Figure 2:
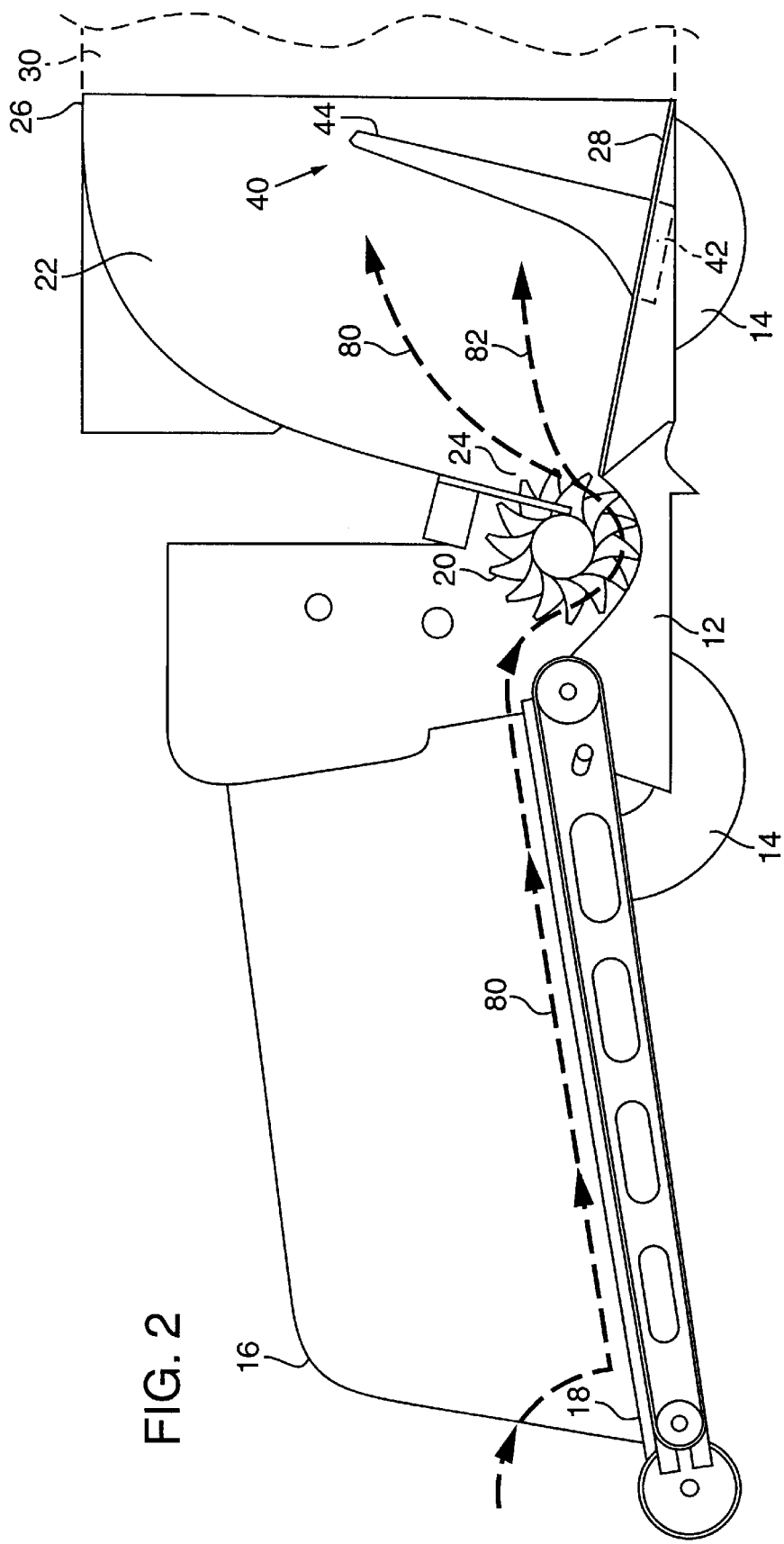
FIG. 2 is a side view in diagram form of the machine of FIG. 1 illustrating the flow path of the material through the machine.

In operation and referring particularly to FIGS. 1 and 2, a bag 30 is fitted to the outlet opening 26 on the tunnel 22. Part of the bag is pulled off and tied to form a closed end 32 as shown in FIG. 1. The material to be bagged is placed in the hopper 16 and the conveyor 18 conveys the material into the rotating rotor 20. The flow diagram of FIG. 2 illustrates the flow path (indicated by arrow 80) of the material through the machine 10. The rotating rotor 20 propels the material through the inlet 24 of the tunnel 22 whereat the material will be propelled against and through the barrier 40. Some material will pass through the barrier 40 (as indicated by arrow 82) and will be deposited into the bag 30. As the material is continued to be propelled by the rotor 20, the material will be bridged against the barrier 40 causing the material to be forced upwardly up and over the barrier 40 and in the process will be compacted by the rotor 20. The material will thus be flowing essentially above and through the barrier 40 and as the compacted material is inserted in the bag 30, it will force part of the bag 30 to be deployed off the end 26 of the tunnel 22. The deployed portion of the bag 30 is deposited on the ground. The deployed portion of the bag with the material deposited therein serves to act as an anchor. As the material is continued to be propelled, compacted and deposited into the bag 30, forces exerted by the material against the bag 30 will propel the machine 10 away from the portion of the bag 30 deposited on the ground. The material being forced over and through the barrier 40 will assure that the bag is completely filled from top to bottom and from side to side.

The force generated by the rotor 20 propelling and compacting the material is initially transmitted to the barrier 40. The force generated by the rotor 20 propelling and compacting the material is thus transmitted to the machine 10 itself since the barrier 40 is mounted on the machine 10. The barrier 40 restricting the flow of material into the bag 30 until the material is in the compacted state alleviates the need of releasably anchoring the machine to restrict machine movement that was common in previous bagging machines. The brakes provided on the wheels 14 is adequate to retard movement of the machine 10 as needed. This is to provide controlled forward movement of the machine such as when the bagging operation is being done on a slope. Further, the selective braking of the wheels on one side of the machine aids in maintaining the machine 10 in alignment with the position of the bag 30 being deposited on the ground.

Figure 5:
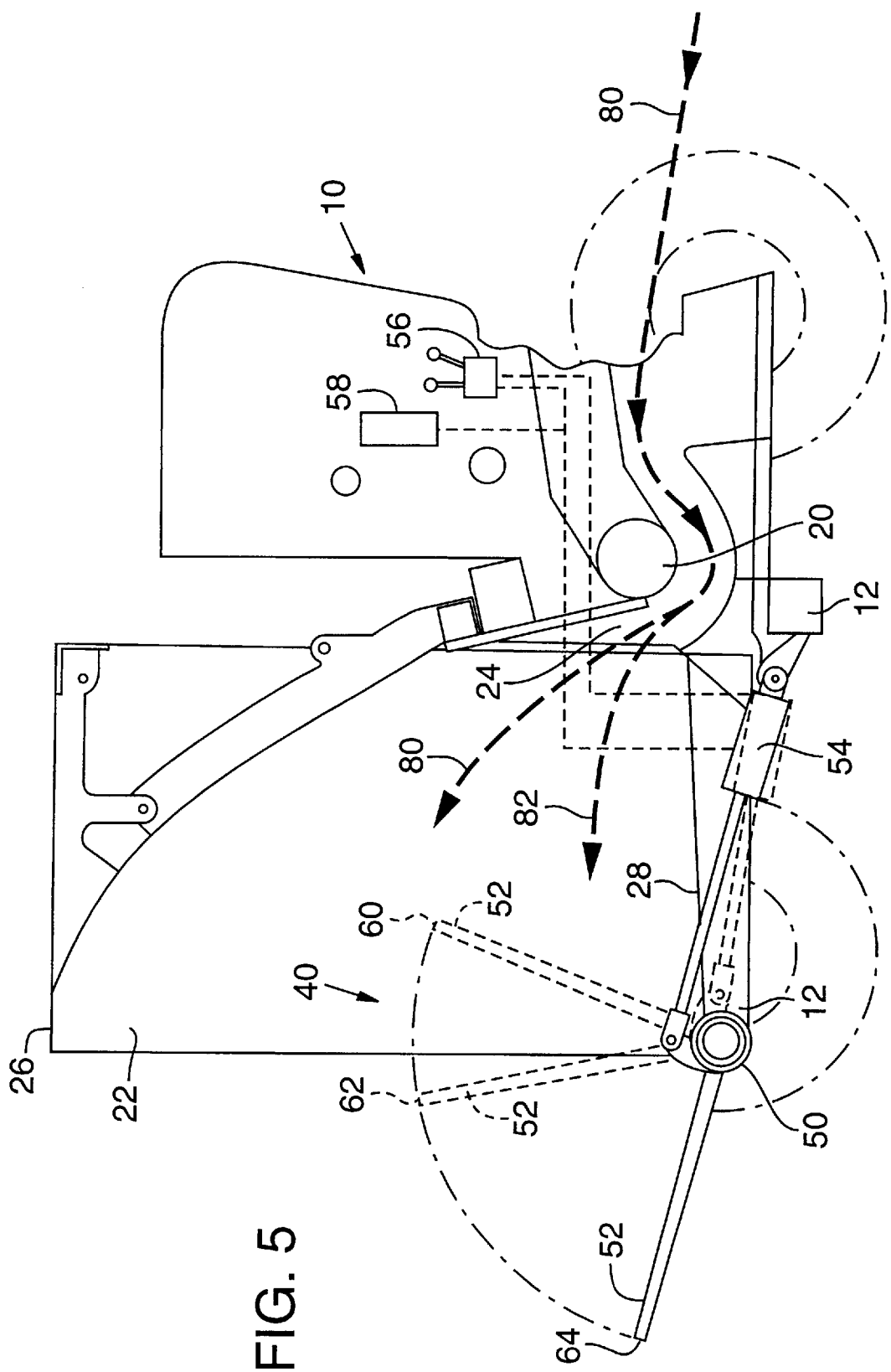
FIG. 5 is a partial view illustrating a further embodiment of the invention.

FIG. 5 illustrates a barrier 40 that is pivotable. A cylindrical beam 50 is extended across the chassis 12, the beam 50 intersecting the floor 28 of the tunnel 22. Upstanding fingers 52 are positioned on the beam 50 and in this embodiment fingers 52 are of equal height. It will be appreciated that the fingers 52 may be of varying heights (similar to fingers 44 of FIG. 4) and that the distance between the fingers 52 may be varied. The fingers 52 are preferably removably mounted to the beam 50 in a conventional manner. The beam 50 is pivotally mounted on the chassis 12 with the beam 50 being pivoted by a cylinder 54 that extends from the chassis 12. Hydraulic controls 56 are provided to control the operation of the cylinder 54 to pivot the beam 50 and thus the fingers 52. The fingers 52 extending from the beam 50 may also be varied in height in the same manner as the fingers 44 on the beam 42 in FIG. 4.

The pivotal control over the pivoting of beam 50 is used to control the flow and the degree of compaction of the material that is to be placed in the bag 30. The beam 50 is initially pivoted such that the fingers 52 are substantially in a vertical position to provide a barrier for material that is being propelled by the rotor 20. This is shown by the fingers 52 in the position designated as 60. The working position of the fingers 52 is between and including the positions 60 and 62 and even beyond the position of 62. The fingers 52 are pivotable to a substantially non-operating position shown at 64.

FIG. 5 also illustrates the flow path of the material through the machine 10 with the path being designated by arrow 80. As the material is continued to be propelled by the rotor 20, the material will engage the barrier and be bridged against the barrier fingers 52 causing a portion the material to be forced upwardly up and over the barrier 40 and in the process will be compacted by the rotor 20. The material will thus be flowing essentially both above and through the barrier 40 as indicated by the flow arrows 80 and 82. Arrows 80 and 82 are not intended to specifically indicate the flow patterns as such flow patterns are varied throughout the filling process.

As the material bridges and piles up against the fingers 52 (barrier 40), the material will be forced to flow over the top of the fingers 52 to fill the bag 30 completely. In the event that the material bridging against the fingers 52 plugs the tunnel 22, the fingers 52 are merely pivoted toward the outlet end of the tunnel 22, that is toward position 62, to facilitate clearing the material from the tunnel 22. Pivoting the fingers toward position 62 allows the rotor 20 to more easily force the material in the tunnel 22 over and through the barrier 40 into the bag 30. When the material has been cleared adequately, the fingers 52 may again be pivoted to position 60 as desired.

It will be appreciated that the fingers 52 may be pivoted to any position between and including positions 60, 62 for the operational cycle. The selection of the position of the fingers 52 will depend on the material to be deposited in the bag 30, the condition of the material and so forth.

The cylinder 54 may also be coupled to an accumulator 58 as shown in FIG. 5 such that the restraining force of the fingers 52 may be maintained at a preset level. The accumulator 58 is of the type charged with a gas such as nitrogen and thus the restraining force on the fingers 52 may be controlled to control the uniform compaction of the material into the bag 30. When the force against the fingers 52 exceeds a predetermined level, the force exerted against the fingers 52 will force the cylinder 54 to extend allowing the fingers to pivot toward the outlet end of the tunnel 22. The controlled positioning of the fingers 52 provides uniform compaction of the material and filling of the bag 30.

Those skilled in the art will recognize that modifications and variations may be made without departing from the true spirit and scope of the invention. The invention is therefore not to be limited to the embodiments described and illustrated but is to be determined from the appended claims.

We claim:

1. A machine for bagging organic materials comprising:
   a chassis including wheels supporting said chassis;
   a tunnel mounted on the chassis having an inlet at the forward end and an open rear end;
   a bag surrounding said tunnel at said open rear end, said tunnel configured at said rear end opening in height and width to provide substantially full opening of the bag;
   a rotor mounted at said inlet and a delivery system for delivering material to said rotor to be force fed by said rotor through said inlet and into the tunnel, through the open end thereof and into the bag and defining thereby a flow path for the material; and
   a barrier mounted in the tunnel spaced rearwardly of the rotor and extending from the floor to an intermediate height of the tunnel and positioned in the flow path for the material and blocking a substantial portion of the flow path, said barrier including spaced apart fingers, spaced so as to cooperatively resist and not prevent passage of the material between the fingers and thereby induce flow in part of the material over the top of the fingers for filling of the upper half of the tunnel prior to insertion of the material into the bag.

2. A machine as defined in claim 1 wherein the fingers are vertically oriented and horizontally spaced apart.

3. A machine as defined in claim 2 wherein the material is silage and the fingers are spaced about 15 inches apart.

4. A machine as defined in claim 2 wherein the fingers are pivotally attached to the tunnel bottom and held rigidly by a releasable holding member, said holding member actuated to allow rearward pivoting and thereby lessening of the interference of material flow.

5. A machine as defined in claim 2 wherein the tunnel has a determined vertical dimension and the fingers are substantially the same height and extend vertically to about half of the vertical dimension of the tunnel.

6. A machine as defined in claim 2 wherein the fingers vary in height, the tallest fingers in the middle and decreasing in height toward the sides.

* * * * *